United States Patent Office 3,146,271
Patented Aug. 25, 1964

3,146,271
UNSATURATED SULFIDES AND SULFOXIDES
AND METHOD OF PREPARATION
Robert P. Louthan, Bartlesville, Okla., assignor to Phillips
Petroleum Company, a corporation of Delaware
No Drawing.  Filed Feb. 20, 1962, Ser. No. 174,403
25 Claims.  (Cl. 260—607)

This invention relates to unsaturated sulfides and sulfoxides. In one of its aspects, the invention relates to the preparation of unsaturated sulfides by reacting vinylcyclohexene with hydrogen sulfide in the presence of ultraviolet light and then reacting one of the products Beta-mercaptoethylcyclohexene-3
1-vinyl-3-mercaptocyclohexane
1-vinyl-4-mercaptocyclohexane
Beta-mercaptoethyl-3-mercaptocyclohexane
Beta-mercaptoethyl-4-mercaptocyclohexane thus formed with allyl bromide. In another of its aspects, the invention relates to the preparation of sulfides by reacting vinylcyclohexene and n-octyl mercaptan in the presence of ultraviolet light. In still another of its aspects, the invention relates to the preparation of 4-cyclo octene-1-thiol by reacting 1,5-cyclooctadiene with $H_2S$ in the presence of a free-radical generator. In a further aspect, the invention relates to the preparation of a sulfide by reacting 4-cyclooctene-1-thiol with allyl bromide. In another aspect, the invention relates to the preparation of a sulfide by reacting 1,5-cyclooctadiene with n-octyl mercaptan in the presence of ultraviolet light. In still another aspect, the invention relates to a novel compound 4-cyclooctene-1-thiol. In another of its aspects, the invention relates to the preparation of sulfoxides from or corresponding to the above-mentioned sulfides by oxidizing the same under conditions herein when employing an oxidizing agent, for example, hydrogen peroxide. In a further aspect of the invention, there is provided a novel modifier for the emulsion polymerization of a conjugated diene. In a still further aspect of the invention, there is provided a process for the emulsion polymerization of a conjugated diene employing 4-cyclooctene-1-thiol.

This application is a continuation-in-part of Serial No. 766,388, filed October 10, 1958, now abandoned.

The compounds of this invention are useful as ingredients in an insect combatting agent. Their use as repellent ingredients is disclosed and claimed by Lyle D. Goodhue, Rector P. Louthan and Kenneth E. Cantrel in Patent 3,000,779, issued September 19, 1961. It is evident that the compounds of this invention can be used alone or in admixture. 4-cyclooctene-1-thiol is useful as an intermediate for the preparation of allyl-5-cyclooctenyl sulfide and the corresponding sulfoxide as shown in Example V hereof.

It is an object of this invention to provide novel unsaturated sulfides and sulfoxides. It is another object of this invention to provide a method for the preparation of a novel unsaturated sulfide. It is a further object of this invention to provide a method for the preparation of a novel unsaturated sulfoxide. Another object of the invention is to provide a novel modifier for the emulsion polymerization of a conjugated diene, for example, the production of a synthetic rubber, e.g. GR–S.

Other aspects, objects and the several advantages of the invention are apparent from this disclosure and the appended claims.

According to this invention, there are provided new compositions of matter comprising at least one compound selected from the group consisting of organic sulfides and sulfoxides which have the following structural characteristics:

$$R_1—X—R_2$$

wherein X is selected from the group consisting of S and $$\overset{O}{\underset{\|}{S}}$$

wherein $R_1$ can be selected from the group consisting of allyl, octyl, and hydrogen, and $R_2$ is selected from I–VI, and wherein, when $R_2$ is selected from I–V, $R_1$ is selected from the group consisting of allyl and octyl and, when $R_2$ is VI, then $R_1$ is selected from the group consisting of allyl, octyl and hydrogen.

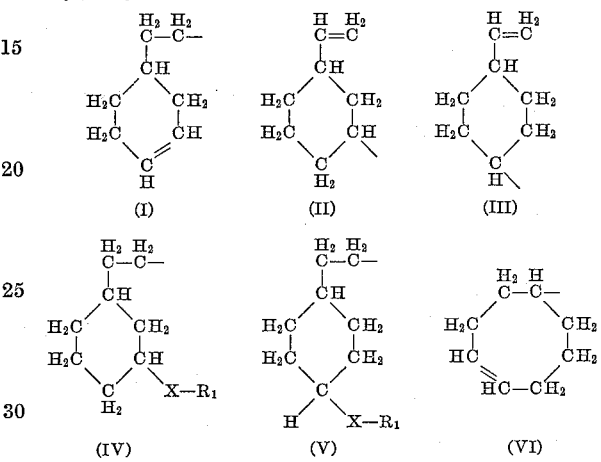

Also, according to the present invention, as more fully stated herein, there is provided a method for preparing an unsaturated sulfide or thiol by reacting one of vinylcyclohexene and 1,5-cyclooctadiene with one of hydrogen sulfide and a mercaptan in the presence of a free-radical generator. Further, the thiols thus produced can be reacted with an aliphatic halide to produce sulfides. Still further, the sulfides from either reaction can then be converted to a sulfoxide by oxidation as herein described.

The new compounds of this invention are as follows:

| Item No. | | Prepared in Example |
|---|---|---|
| 1 | Beta-allylmercaptoethylcyclohexene-3 | I |
| 2 | 1-vinyl-3-allylmercaptocyclohexane | I |
| 3 | 1-vinyl-4-allylmercaptocyclohexane | I |
| 4 | Allyl 2-(3-cyclohexenyl)ethyl sulfoxide | I |
| 5 | Allyl 3-vinylcyclohexyl sulfoxide | I |
| 6 | Allyl 4-vinylcyclohexyl sulfoxide | I |
| 7 | 1-beta-allylmercaptoethyl-3-allylmercaptocyclohexane | II |
| 8 | 1-beta-allylmercaptoethyl-4-allylmercaptocyclohexane | II |
| 9 | Allyl 3-(2-allylsulfinylethyl)cyclohexyl sulfoxide | II |
| 10 | Allyl 4-(2-allylsulfinylethyl)cyclohexyl sulfoxide | II |
| 11 | Beta-n-octylmercaptoethylcyclohexene-3 | III |
| 12 | 1-vinyl-3-(octylmercapto)cyclohexane | III |
| 13 | 1-vinyl-4-(octylmercapto)cyclohexane | III |
| 14 | 2-(3-cyclohexenyl)ethyl n-octyl sulfoxide | III |
| 15 | 3-vinylcyclohexyl n-octyl sulfoxide | III |
| 16 | 4-vinylcyclohexyl n-octyl sulfoxide | III |
| 17 | 1-beta-n-octylmercaptoethyl-3-n-octylmercaptocyclohexane | IV |
| 18 | 1-beta-n-octylmercaptoethyl-4-n-octylmercaptocyclohexane | IV |
| 19 | n-Octyl 3-(2-octylsulfinylethyl)cyclohexyl sulfoxide | IV |
| 20 | n-Octly 4-(2-n-octylsulfinylethyl)cyclohexyl sulfoxide | IV |
| 21 | Allyl 4-cyclooctenyl sulfide | V |
| 22 | Allyl 4-cyclooctenyl sulfoxide | V |
| 23 | 4-cyclooctenyl n-octyl sulfide | VI |
| 24 | 4-cyclooctenyl n-octyl sulfoxide | VI |
| 25 | 4-cyclooctene-1-thiol | VII |

The compositions herein disclosed can be prepared as illustrated in the examples. More broadly, 4-vinylcyclohexene or 1,5-cyclooctadiene can be reacted with hydrogen sulfide or the desired mercaptan to produce products formed by reaction of one mol of the diolefin with one or two mols of hydrogen sulfide or mercaptan. This reaction is ordinarily effected with an activating agent as in the presence of ultraviolet rays or ionizing rays (X-rays, gamma rays, beta rays, etc.) at temperatures in the range of −40 to 250° C., and more commonly 0 to 100° C. Most commonly, the reaction is effected in the liquid phase at pressures sufficient to maintain the reactants substantially all in the liquid phase.

The reaction can be effected, if desired, in the presence of a diluent such as a paraffinic hydrocarbon. The products can be recovered by distillation of the reaction mixture. When hydrogen sulfide is used in this first reaction with the diolefin, the products are thiols which can be reacted with the desired aliphatic halide, e.g., allyl bromide or octyl bromide, to produce the sulfide.

The reaction of the thiols and aliphatic halide is commonly effected in a methanol solution at temperatures of 0 to 200° C. Sodium hydroxide or other alkali metal base is required to effect the reaction between the thiol and halide.

The sulfides which result according to the above-described reactions can be oxidized to the corresponding sulfoxides. The oxidation can be carried out in an organic solvent medium. Acetic acid, acetone, and methanol are common solvents. Oxidizing agents, such as oxygen with nitrogen dioxide, hydrogen peroxide, nitric acid, chromic acid and potassium permanganate, have been employed for this type of reaction. Generally, the oxidation is effected with a near theoretical amount of the oxidizer at temperatures of 0 to 200° C. The sulfoxide can be recovered from the reaction mixture by dissolving or extracting in a suitable solvent and purified by crystallization.

EXAMPLE I

*Mixture of Sulfoxides From 1-Beta-Allylmercaptoethyl-cyclohexene-3,1-Vinyl-3-Allylmercaptocyclohexane and 1-Vinyl-4-Allylmercaptocyclohexane*

4-vinylcyclohexene (67.5 grams) was reacted with hydrogen sulfide (85 grams) in a reactor comprising a quartz tube contained in a pressure vessel. The contents of the reaction vessel were irradiated through the quartz tube with ultraviolet light from a mercury vapor lamp. The reaction was effected at temperatures in the range of 60 to 70° F. and at pressures of about 170 to 200 p.s.i.g. The product obtained from six runs amounted to 601.2 grams. A trace (about 0.1 gram) of t-butylcatechol was added to stabilize the product which was then flash distilled at a pressure of about 15 mm. of mercury to yield 511.3 grams of a product which distilled at a kettle temperature of about 250° C. The flashed material was redistilled at a pressure of 16 mm. of mercury. The fractions distilling at 97–128° C., but consisting essentially of material boiling at 97° C., were collected and found to have a refractive index, $n_D^{20}$, of 1.5108 to 1.5172. The combined fractions represent a mixture of products comprising beta-mercaptoethylcyclohexene-3, and 1-vinyl-3-mercaptocyclohexane and 1-vinyl-4-mercaptocyclohexane. The mixture (237.6 grams) was mixed with 325 ml. of methyl alcohol and 73.5 grams sodium hydroxide. Allyl bromide in amount of 202 grams was added slowly to the mixture so as to effect refluxing of the solvent. The reaction mixture was subsequently cooled, diluted with water (about 500 ml.), and the organic phase was recovered and washed with water. The sulfides were recovered by distillation in amount of 270 grams representing a yield of 88.7 percent and represented two fractions boiling at 124–136° C. at 15 mm. of mercury pressure and having a refractive index, $n_D^{20}$, of 1.5130 to 1.5136. These sulfides were reacted with hydrogen peroxide using 150 grams of the sulfides diluted with 250 milliliters methanol and 92.5 grams of 30 percent hydrogen peroxide.

The hydrogen peroxide was added slowly. During the addition, the reaction mixture refluxed. Subsequently, the mixture was diluted with water (approximately 500 ml.) and about 100 ml. of n-pentane and 500 ml. of diethyl ether. The pentane-ether solution was then separated, and the products were recovered from the solution by stripping at 80 °C. at a pressure of 1 mm. The recovered product was a liquid at temperatures above about 25° C. and had a refractive index, $n_D^{20}$, of 1.5273. The liquid crystallized when stored at temperatures of about 10° C. This product represents a mixture of the following sulfoxides:

Allyl 2-(3-cyclohexenyl)ethyl sulfoxide
Allyl 3-vinylcyclohexyl sulfoxide
Allyl 4-vinylcyclohexyl sulfoxide.

These compounds are represented by the formulas:

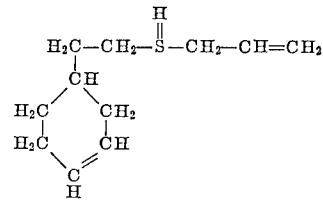

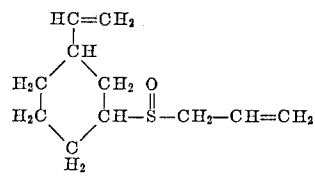

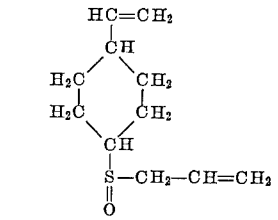

EXAMPLE II

*Mixture of Sulfoxides From Beta-Mercaptoethyl-3-Mercaptocyclohexane and Beta-Mercaptoethyl-4-Mercaptocyclohexane*

A mixture of products comprising beta-mercaptoethyl-3-mercaptocyclohexane and beta-mercaptoethyl-4-mercaptocyclohexane was recovered from the run described in Example I wherein hydrogen sulfide was reacted with 4-vinylcyclohexene. After removal of the fractions distilling at 97–128° C., fractions boiling at 147–149° C. at 16 mm. of mercury pressure and having a refractive index, $n_D^{20}$, of 1.5386–1.5423 were combined. These high boiling fractions represent the dimercaptans named above. These dimercaptans were reacted with allyl bromide using the recipe:

RECIPE

| | | |
|---|---|---|
| Beta-mercaptoethyl-3- and 4-mercaptocyclohexane | grams | 157.5 |
| Methanol | ml | 560 |
| Allyl bromide | grams | 227 |
| Sodium hydroxide | do | 82.5 |

The sulfide mixture (beta-allylmercaptoethyl-3-allylmercaptocyclohexane and beta-allylmercaptoethyl-4-allylmercaptocyclohexane) which was recovered was oxidized to yield 1-(2-[allylsulfinyl]ethyl)-3-allylsulfinylcyclohexane and 1-(2-[allylsulfinyl]ethyl)-4-allylsulfinylcyclohexane. In the preparation, 100 grams of the sulfides were diluted with 115 milliliters of methanol and reacted with 87.5 grams of 30 percent hydrogen peroxide. The water was stripped from the reaction mixture by heating at 80° C. at a pressure of 1 mm. of mercury. The yield was 109.2 grams of a slightly colored, viscous liquid having a refractive index, $n_D^{20}$, of 1.5510. This product is a mixture comprising:

Allyl 3-(2-allylsulfinylethyl)cyclohexyl sulfoxide
Allyl 4-(2-allylsulfinylethyl)cyclohexyl sulfoxide These compounds are represented, respectively, by the formulas:

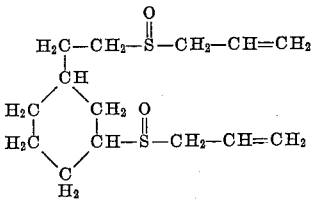

and

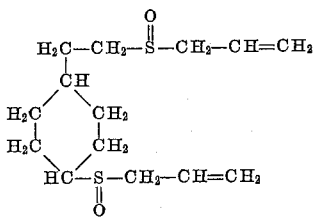

EXAMPLE III

*Preparation of Sulfoxide Mixture From 4-Vinylcyclohexene and n-Octyl Mercaptan* n-Octyl mercaptan (359 grams) was reacted with 4-vinylcyclohexene (191 grams) at a temperature of 65–71° F. while irradiated through quartz with a 100 watt mercury vapor lamp. After a 2-hour reaction period, the reaction mixture was distilled at a pressure of 4.5 mm. of mercury to recover unreacted mercaptan. The residue was distilled at 0.4 to 0.5 mm. to give monoadducts boiling at 143° C. at 0.4 mm. of mercury pressure and having a refractive index, $n_D^{20}$, of 1.4912. An analogous fraction from another run was prepared and the two fractions mixed. The sulfides 1-(beta-n-octylmercapto)-ethylcyclohexene-3, 1-vinyl-3-(octylmercapto)cyclohexane and 1-vinyl-4-(octylmercapto)cyclohexane were then oxidized to the sulfoxides using hydrogen peroxide. The recovered sulfoxides had a boiling point of 46–48° C. and represented a mixture of three sulfoxides:

2-(3-cyclohexenyl)ethyl n-octyl sulfoxide
3-vinylcyclohexyl n-octyl sulfoxide
4-vinylcyclohexyl n-octyl sulfoxide These compounds can be represented, respectively, by:

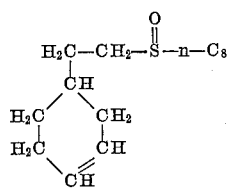

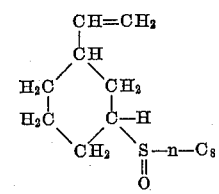

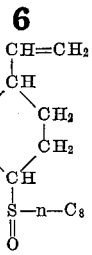

where n-C₈ represents the n-octyl group.

EXAMPLE IV

Compounds representing a mixture of compounds designated as 17 and 18 and 19 and 20 above were prepared by reaction of vinylcyclohexene (191 grams) and n-octyl mercaptan (359 grams). The reactants were irradiated with a 100 watt mercury vapor lamp for 120 minutes at a temperature of 65 to 78° F. The reaction mixture was distilled and a fraction (95 grams) boiling at 220 to 227° C. at 0.45 mm. of mercury pressure was recovered. This fraction was combined with a similar fraction obtained from another preparation. The combined fractions were carefully distilled to yield a mixture of 1-beta-n-octylmercaptoethyl-3-n-octylmercaptocyclohexane
1-beta-n-octylmercaptoethyl-4-n-octylmercaptocyclohexane having a refractive index $n_D^{20}$, of 1.4977 and a boiling point at 0.45 mm. mercury pressure of 221–223° C.

This mixture of sulfides was oxidized to the corresponding sulfoxides, said mixture being a crystalline solid at room temperature (20–25° C.).

EXAMPLE V

*Preparation of Allyl 4-Cyclooctenyl Sulfide and the Corresponding Sulfoxide*

The sulfide was prepared using the following recipe:

| | |
|---|---|
| 4-cyclooctene-1-thiol _____ grams __ | 117 |
| Allyl bromide _____ do ____ | 110 |
| Methanol _____ ml ____ | 250 |
| Sodium hydroxide _____ grams __ | 36 |

The reaction was effected in a glass flask equipped with a thermometer, stirrer and condenser. The allyl bromide was added slowly and with refluxing of the mixture. The mixture was subsequently cooled, diluted with water (about 500 ml.), and the organic phase was recovered and washed with water.

Distillation of the organic phase yielded the sulfide which boiled at 121–122° C. at a pressure of 9.25 mm. of mercury and having a refractive index, $n_D^{20}$, of 1.5257.

The allyl 4-cyclooctenyl sulfide (75 grams) was diluted with 125 ml. of methanol and reacted with 47 grams of 30 percent hydrogen peroxide. A yield of 80.2 grams of the sulfoxide was recovered. It had a refractive index $n_D^{20}$, of 1.5390.

EXAMPLE VI

*n-Octyl 4-Cyclooctenyl Sulfide and Sulfoxide* n-Octyl 4-cyclooctenyl sulfide and the corresponding sulfoxide were prepared in a manner analogous to that described in Example IV by the ultraviolet light promoted addition of n-octyl mercaptan to 1,5-cyclooctadiene to give the sulfide and oxidizing the sulfide to the sulfoxide with hydrogen peroxide.

The properties of the sulfide and sulfoxide were as follows:

| | Boiling Point, ° C. | $n_D^{20}$ |
|---|---|---|
| Sulfide_____ | 136 at 0.20 mm. Hg_____ | 1.4982 |
| Sulfoxide_____ | Not determined_____ | 1.5058 |

In the following table are summarized analytical data relating to compounds in the several examples.

TABLE I.—ANALYSIS OF COMPOUNDS

| Compound | Percent by weight | | | | | |
|---|---|---|---|---|---|---|
| | Carbon | | Hydrogen | | Sulfur | |
| | Calc. | Found | Calc. | Found | Calc. | Found |
| Example I: | | | | | | |
| A. Mixture of 1-beta-allymercaptoethylcyclohexena-3 with 1-vinyl-3-allylmercaptocyclohexane and 1-vinyl 4-allylmercaptocyclohexane | 72.5 | 72.5 | 9.9 | 10.0 | 17.6 | 17.1 |
| B. Corresponding Sulfoxides, mixture | 66.6 | 66.1 | 9.1 | 9.0 | 16.2 | 15.5 |
| Example II: | | | | | | |
| A. Mixture of beta-allylmercaptoethyl-3-allylmercaptocyclohexane and beta-mercaptoethyl-4-allylmercaptocyclohexane | 65.6 | 66.0 | 9.4 | 9.3 | 25.0 | 26.5 |
| B. Corresponding Sulfoxides, mixtures | 58.3 | 56.8 | 8.3 | 8.3 | 22.3 | 22.1 |
| Example III: | | | | | | |
| A. Mixture of beta-n-octlmercaptoethylcyclohexene-3 with 1-vinyl-3-n-octomercaptocyclohexane and 1-vinyl-4-n-octylmercaptocyclohexane | 75.6 | 75.3 | 11.8 | 11.5 | 12.6 | 13.4 |
| B. Corresponding Sulfoxides, mixture | 71.2 | 71.2 | 11.1 | 11.1 | 11.9 | 11.4 |
| Example IV: | | | | | | |
| A. Mixture of beta-n-octylmercaptoethyl-3-n-octylmercaptocyclohexane and 1-beta-n-octylmercaptoethyl-4-n-octylmercaptocyclohexane | 72.0 | 71.9 | 12.0 | 11.9 | 16.0 | 17.0 |
| B. Corresponding Sulfoxides, mixture | 66.7 | 66.1 | 11.1 | 11.0 | 14.8 | 14.8 |
| Example V: | | | | | | |
| A. Allyl 4-cyclooctenyl sulfide | 72.5 | 72.5 | 9.9 | 9.9 | 17.6 | 18.0 |
| B. Allyl 4-cyclooctenyl sulfoxide | 66.1 | 65.7 | 9.1 | 9.1 | 16.2 | 18.4 |
| Example VI: | | | | | | |
| A. 4-cyclooctenyl n-octyl sulfide | 75.6 | 75.7 | 11.8 | 11.8 | 12.6 | 14.0 |
| B. 4-cyclooctenyl n-octyl sulfoxide | 71.2 | 70.9 | 11.1 | 11.1 | 11.9 | 12.1 |

According to the present invention, the 4-cyclooctene-1-thiol of Example V hereof can be prepared by the reaction of 1,5-cyclooctadiene with hydrogen sulfide in the presence of a free-radical generator or supplier. A surprising feature of this invention is that the mol ratio of $H_2S$ to 1,5-cyclooctadiene has little effect on the number of mercaptan groups introduced into the molecule. It might be expected that mol ratios above 1:1 mercaptan to diene would bring about the formation of cyclooctane dithiol. However, even though large excesses of mercaptan are used, the monothiol predominates.

Thus, according to the process of this invention, 1,5-cyclooctadiene is contacted with $H_2S$ in the presence of a free-radical generator at a temperature of from 50 to 200° F. The pressure in the reaction zone is not critical and will generally be the equilibrium pressure of the reaction mixture at the reaction temperature being employed. Generally, these pressures will range from atmospheric up to around 300 p.s.i.g. If desired, diluents can be employed, although in some instances this will have a tendency to slow down the reaction rate. If ultraviolet light is employed as the source of free radicals as hereinafter described, any diluent that is chosen should be transparent to the ultraviolet light. Inert diluents which can be used as desired include the saturated acyclic and cyclic hydrocarbons such as n-pentane, isooctane, cyclohexane and the like.

In effecting the reaction of $H_2S$ with 1,5-cyclooctadiene (COD), the mol ratio of $H_2S$/COD will range from 0.75 to 5.0, preferably from 1.0 to 3.0. Mol ratios outside this range can be employed if desired, although lower ratios will bring about lower yields, and higher ratios have little effect on the reaction. As stated above, it is particularly surprising that, when high mol ratios of $H_2S$ to COD are used, the monothiol still predominates.

EXAMPLE VII

A series of runs was carried out in which 1,5-cyclooctadiene was reacted with $H_2S$ in the presence of ultraviolet light. In each of these runs, the desired amount of the reactants was charged to a 150 cc. reactor which was fitted with a quartz tube through which the contents of the reactor could be irradiated with the light from a 100 watt mercury vapor lamp. After the desired reaction time, the products were recovered by fractionating the reaction mixture at reduced pressure. The following table summarizes these runs. The fractionation data are shown for the range of temperatures, pressures, weights, etc. for the middle fractions.

TABLE II

| Run No. | Reaction | | | | | Fractionation | | | |
|---|---|---|---|---|---|---|---|---|---|
| | Charge, Grams | | Pressure, p.s.i.g. | Time, Min. | Temp., ° F. | Head Temp., ° C. | Pressure, mm. Hg abs. | Weight, Grams | Refractive Index, $n_D^{20}$ |
| | $H_2S$ | 1,5-Cyclo-octadiene | | | | | | | |
| 1 | 85.0 | 67.5 | 170–210 | 60 | 68–75 | 91.5–127 | 14.0 | 55.2 | 1.5183–1.5322 |
| 2 | 37 | 108 | 58–108 | 60 | 57–68 | 89–133 | 14.0 | 74.1 | 1.5110–1.5312 |
| 3 | 20 | 130 | 9–62 | 90 | 54–70 | 70–87 | 0.7–14.0 | 48.2 | 1.4965–1.5300 |
| 4 [1] | 20 | 130 | 10–95 | 90 | 55–160 | 93–130 | 0.2–14.0 | 46.1 | 1.5057–1.5380 |
| 5 | 55 | 86 | 122–140 | 60 | 56–67 | 87–91 | 0.25–15.0 | 71.1 | 1.4988–1.5350 |

[1] A trace of thio-beta-naphthol was added in this run.

The material from the above fractionations was combined and redistilled. A cut boiling at 91.5° C. at 13.0 mm. Hg absolute pressure had a refractive index of 1.5257. A sample of this cut was then subjected to elemental analysis.

| | Figures in percent by weight | |
|---|---|---|
| | Calculated for 4-cyclo-octene-1-thiol | Found |
| Carbon | 67.6 | 67.4 |
| Hydrogen | 9.9 | 9.8 |
| Sulfur | 22.5 | [1] 22.0 |

[1] This figure is for total sulfur. Analysis for mercaptan sulfur showed 20 percent by weight.

EXAMPLE VIII

An emulsion polymerization run was carried out in which the 4-cyclooctene-1-thiol prepared in Example VII was employed as the modifier. The thiol used was from the same fractionation cut which was analyzed in Example VII.

The following polymerization recipe was employed in this run:

RECIPE

| Ingredient: | Parts by weight |
|---|---|
| Butadiene | 70 |
| Styrene | 30 |
| Water | 180 |
| Potassium fatty acid soap | 5 |
| Potassium chloride | 0.2 |
| p-Methane hydroperoxide | 0.06 |
| $FeSO_4 \cdot 7H_2O$ | 0.01 |
| Chelating agent * | 0.02 |
| Sodium formaldehyde sulfoxylate | 0.05 |
| 4-cyclooctene-1-thiol | 0.173 |

*Sequestrene AA.

The polymerization was carried out at 41° F. for 12 hours, and the percent conversion to rubber was 62 percent. The inherent viscosity of the rubber was 3.53. The rubber contained 16 percent gel and had a swelling index of 137.

It can be seen from the above run that 4-cyclooctene-1-thiol, a novel compound, functions as a modifier in emulsion polymerization.

The terminology "free-radical generator" or "supplier" as used herein can be a chemical source of free radicals such as peroxides and hydroperoxides and is also intended to include actinic radiation which causes the formation of free radicals in situ. A preferred form of actinic radiation is ultraviolet light, especially that portion of the spectrum ranging from 100 to 3800 Angstroms. Other forms of radiation, such as gamma rays, from any suitable source can be utilized, if desired.

Reasonable variation and modification are possible within the scope of the foregoing disclosure, and appended claims to the invention, the essence of which is that unsaturated sulfides and sulfoxides as herein set forth and described have been prepared.

I claim:

1. A composition of matter which comprises at least one compound selected from the group consisting of sulfides and sulfoxides which have the following structural characteristics:

$$R_1-X-R_2$$

wherein X is selected from the group consisting of S and

wherein $R_1$ is selected from the group consisting of allyl, octyl, and hydrogen, and $R_2$ is selected from I–VI, and wherein, when $R_2$ is selected from I–V, $R_1$ is selected from the group consisting of allyl and octyl and, when $R_2$ is VI, then $R_1$ is selected from the group consisting of allyl, octyl and hydrogen—

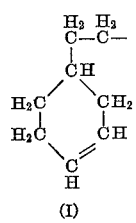 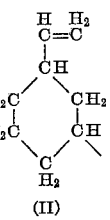 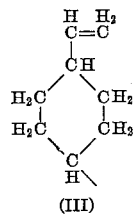

(I)  (II)  (III)

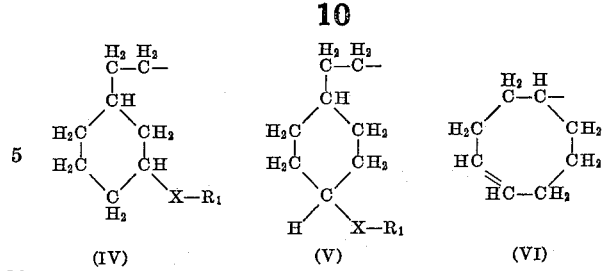

(IV)  (V)  (VI)

2. A compound selected from the group consisting of

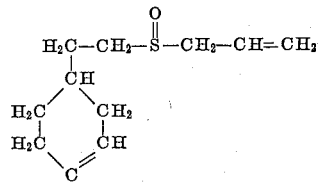

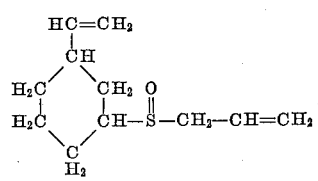

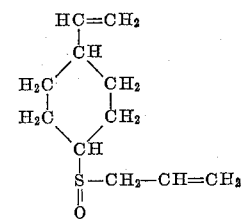

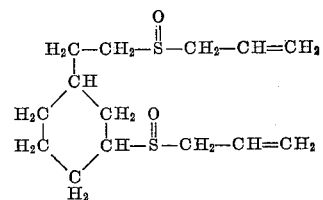

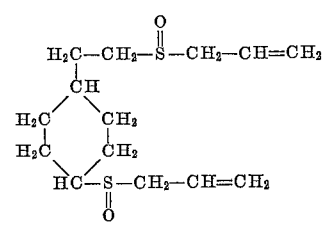

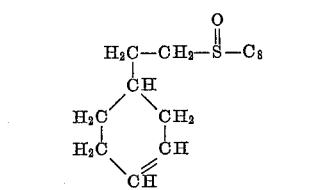

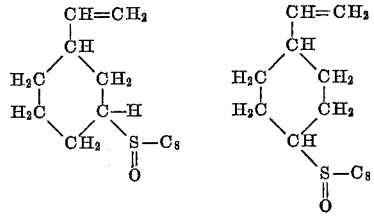

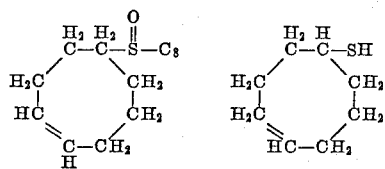

where —C₈ is normal octyl.

3. A method of preparing an unsaturated sulfide which comprises reacting a member of the group consisting of vinylcyclohexene and 1,5-cyclooctadiene with a compound selected from a group consisting of hydrogen sulfide and a mercaptan in the presence of ultraviolet light and then reacting a compound selected from a group consisting of a mono-thiol and a di-thiol thus formed with allyl bromide.

4. A method of preparing a sulfoxide which comprises reacting a sulfide of claim 3 with hydrogen peroxide.

5. A method of preparing a sulfide which comprises reacting 4-cyclooctene-1-thiol with allyl bromide in the presence of sodium hydroxide.

6. A method according to claim 5 wherein the sulfide is converted to sulfoxide by reacting said sulfide with hydrogen peroxide.

7. A method of preparing n-octyl-4-cyclooctenyl sulfide which comprises reacting 1,5-cyclooctadiene and n-octyl mercaptan in the presence of ultraviolet light.

8. A method according to claim 7 which comprises converting said sulfide to the corresponding sulfoxide by oxidizing the same employing hydrogen peroxide.

9. Allyl 2-(3-cyclohexenyl)ethyl sulfoxide.
10. Allyl 3-vinylcyclohexyl sulfoxide.
11. Allyl 4-vinylcyclohexyl sulfoxide.
12. 1-vinyl-3-(octylmercapto)cyclohexane.
13. 2-(3-cyclohexenyl)ethyl n-octyl sulfoxide.
14. 3-vinylcyclohexyl n-octyl sulfoxide.
15. 4-vinylcyclohexyl n-octyl sulfoxide.
16. 1-beta-n-octylmercaptoethyl - 3 - n - octylmercaptocyclohexane.
17. Allyl 4-cyclooctenyl sulfide.
18. Allyl 4-cyclooctenyl sulfoxide.
19. 4-cyclooctenyl n-octyl sulfide.
20. 4-cyclooctenyl n-octyl sulfoxide.
21. A method for the preparation of 4-cyclooctene-1-thiol which comprises reacting 1,5-cyclooctadiene and $H_2S$ in the presence of a free-radical generator.
22. A method according to claim 21 wherein the temperature is in the range 50–200° F., and ultraviolet light is used as a free-radical generator.
23. A method for the preparation of an unsaturated sulfide which comprises reacting 1,5-cyclooctadiene with a compound selected from the group consisting of hydrogen sulfide and a mercaptan in the presence of an activating agent and then reacting the thiol thus formed with an aliphatic halide selected from the group consisting of allyl and alkyl halides to form a compound selected from the group consisting of an allyl and an alkyl cyooctenyl sulfide.
24. A method for the preparation of allyl 4-cyclooctenyl sulfide which comprises reacting 1,5-cyclooctadiene with hydrogen sulfide in the presence of a free-radical generator to form 4-cyclooctene-1-thiol and then reacting the last-named compound with an aliphatic halide selected from the group consisting of allyl and alkyl halides.
25. 4-cyclooctene-1-thiol.

References Cited in the file of this patent

UNITED STATES PATENTS

| | | |
|---|---|---|
| 1,062,973 | Holt | May 27, 1913 |
| 2,665,272 | Reynolds et al. | Jan. 5, 1954 |
| 2,810,765 | Neuworth et al. | Oct. 22, 1957 |
| 2,833,829 | Schrader | May 6, 1958 |

UNITED STATES PATENT OFFICE
CERTIFICATE OF CORRECTION

Patent No. 3,146,271                              August 25, 1964

Rector P. Louthan

It is hereby certified that error appears in the above numbered patent requiring correction and that the said Letters Patent should read as corrected below.

In the grant, line 1, and in the heading to the printed specification, line 4, for "Robert P. Louthan", each occurrence, read -- Rector P. Louthan --.

Signed and sealed this 6th day of July 1965.

(SEAL)
Attest:

ERNEST W. SWIDER                             EDWARD J. BRENNER
Attesting Officer                                Commissioner of Patents